US008069179B2

(12) United States Patent
Chickering et al.

(10) Patent No.: US 8,069,179 B2
(45) Date of Patent: Nov. 29, 2011

(54) PREFERENCE JUDGEMENTS FOR RELEVANCE

(75) Inventors: David M. Chickering, Bellevue, WA (US); Paul N. Bennett, Kirkland, WA (US); Susan T. Dumais, Kirkland, WA (US); Benjamin Austin Carterette, Amherst, MA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/108,531

(22) Filed: Apr. 24, 2008

(65) Prior Publication Data

US 2009/0271389 A1  Oct. 29, 2009

(51) Int. Cl.
*G06F 7/00* (2006.01)
*G06F 17/30* (2006.01)

(52) U.S. Cl. ............... 707/758; 707/723; 707/748

(58) Field of Classification Search ............... None
See application file for complete search history.

(56) References Cited

U.S. PATENT DOCUMENTS

| | | | |
|---|---|---|---|
| 5,535,382 A | 7/1996 | Ogawa | |
| 5,808,615 A | 9/1998 | Hill et al. | |
| 6,598,058 B2* | 7/2003 | Bird et al. | 1/1 |
| 6,766,316 B2 | 7/2004 | Caudill et al. | |
| 6,829,599 B2 | 12/2004 | Chidlovskii | |
| 6,886,010 B2* | 4/2005 | Kostoff | 1/1 |
| 7,111,000 B2 | 9/2006 | Wen et al. | |
| 7,295,967 B2* | 11/2007 | Corman et al. | 704/9 |
| 7,647,314 B2* | 1/2010 | Sun et al. | 706/12 |
| 7,657,507 B2* | 2/2010 | Shi et al. | 707/999.002 |
| 7,685,078 B2* | 3/2010 | Chen et al. | 706/12 |
| 2007/0073748 A1 | 3/2007 | Barney | |
| 2007/0088695 A1 | 4/2007 | Bleyendaal et al. | |
| 2007/0208730 A1 | 9/2007 | Agichtein et al. | |

OTHER PUBLICATIONS

Chris Buckley, et al. Retrieval Evaluation with Incomplete Information. SIGIR'04, Jul. 25-29, 2004, Sheffield, South Yorkshire, UK. ACM 1-58113-881-04/04/0007. http:lldoi.acm.org110. 114511008992.1009000. Last accessed 1125108, 8 pages.*
J. Diez, et al. A Clustering Algorithm to Find Groups with Homogeneous Preferences h t tp://re sea rch. m ic ros oft. co m/-s d u m a is/SIGIR 2003/ExtendedAbstracts/BAHAMONDE_clustering_ preferences.pdf.Last accessed Jan. 25, 2008, 4 pages. Last accessed Jan. 25, 2008, 4 pages.*
Filip Radlinski, et al. Query Chains: Learn to Rank from Implicit Feedback, Research Track Paper, KDD'05, Aug. 21-24, 2005, Chicago, Illinois, USA. ACM 1-59593-135-X/05/0008. http://delivery. acm.org/10.1145/1090000/1081899/p239-radlinski.pdf?key1= 108 1899&key2=1504511021&coll=GUIDE&dl=GUIDE& CFID= 51337974&CFTOKEN=47070968. Last accessed Jan. 25, 2008, 10 pages.

(Continued)

*Primary Examiner* — Pierre Vital
*Assistant Examiner* — Loan T Nguyen
(74) *Attorney, Agent, or Firm* — Lee & Hayes, PLLC

(57) ABSTRACT

The claimed subject matter provides a system that trains or evaluates ranking techniques by employing or obtaining relative preference judgments. The system can include mechanisms that retrieve a set of documents from a storage device, combine the set of documents with a query or judgment task received via an interface to form a comparative selection panel, and present the comparative selection panel for evaluation by an assessor. The system further requests the assessor to make a selection as to which document included in the set of documents and presented in the comparative selection panel most satisfies the query or judgment task, and thereafter produces a comparative assessment of the set of documents based on the selections elicited from the assessor and associated with the set of documents.

15 Claims, 15 Drawing Sheets

600 —

| | BAD | FAIR | GOOD | EXCELLENT | PERFECT | TOTAL |
|---|---|---|---|---|---|---|
| BAD | 0.579 | 0.290 | 0.118 | 0.014 | 0.000 | 221 |
| FAIR | 0.208 | 0.332 | 0.309 | 0.147 | 0.003 | 307 |
| GOOD | 0.095 | 0.348 | 0.286 | 0.260 | 0.011 | 273 |
| EXCELLENT | 0.011 | 0.167 | 0.264 | 0.535 | 0.022 | 269 |
| PERFECT | 0.000 | 0.042 | 0.125 | 0.250 | 0.583 | 24 |

OTHER PUBLICATIONS

Filip Radlinski, et al. Evaluating the Robustness of Learning from Implicit Feedback. W4: Learning in Web Search, at the 22nd International Conference on Machine Learning, Bonn, Germany, 2005. http://www.cs.cornell.edu/People/tj/publications/radlinski_joachims_05b.pdf. Last accessed Jan. 25, 2008, 8 pages.

J. Diez, et al. A Clustering Algorithm to Find Groups with Homogeneous Preferences http://research.microsoft.com/~sdumais/SIGIR2003/ExtendedAbstracts/BAHAMONDE_clustering_preferences.pdf. Last accessed Jan. 25, 2008, 4 pages.

T. Joachims, et al. Accurately Interpreting Clickthrough Data as Implicit Feedback, SIGIR'05, Aug. 15-19, 2005, Salvador, Brazil. ACM 1-59593-034-5/05/0008. http://www.cs.cornell.edu/People/tj/publications/joachims_etal_05a.pdf. Last accessed Jan. 25, 2008, 8 pages.

Ellen M. Voorhees. Evaluation by Highly Relevant Documents. SIGIR'01, Sep. 9-12, 2001, New Orleans, Louisiana, USA. ACM 1-58113-331-6/01/0009. http://www-ufrima.imag.fr/FORMATION/FILIERE/MASTER/SI/SiteMasterSI/Documents/MORI/p74-voorhees.pdf. Last accessed Jan. 25, 2008, 9 pages.

K. Jarvelin, et al. IR evaluation methods for retrieving highly relevant documents. Published in: Belkin, N.J., Ingwersen, P. and Leong, M.-K. (eds.) Proceedings of the 23rd Annual International ACM SIGIR Conference on Research and Development in Information Retrieval. New York, NY: ACM, pp. 41-48. SIGIR 2000 7•00 Athens, Greece. ACM 1o58113-226-3/0010007. http://www.info.uta.fi/tutkimus/fire/archive/KJJKSIGIR00.pdf., Last accessed Jan. 25, 2008, 9 pages.

Ben Carterette, et al. Learning a Ranking from Pairwise Preferences, SIGIR'06, Aug. 6-10, 2006, Seattle, Washington, USA, ACM 1595933697/06/0008. http://ciir.cs.umass.edu/~carteret/sigir06-poster.pdf. Last accessed Jan. 25, 2008, 2 pages.

Chris Burges, et al. Learning to Rank using Gradient Descent, Proceedings of the 22nd International Confer-ence on Machine Learning, Bonn, Germany, 2005. http://research.microsoft.com/~cburges/papers/icml_ranking.pdf. Last accessed Jan. 25, 2008, 8 pages.

Brian Bartell, et al. Learning to Retrieve Information. In Current trends in connectionism: Proceedings of the Swedish Conference on Connectionism (LEA: Hillsdale, 1995), L. Niklasson and M. Boden, Eds. http://citeseer.ist.psu.edu/cache/papers/cs/44/http:zSzzSzww w cse.ucsd.eduzSzuserszSzgaryzSzpubszSzsncc95.pdf/bartell95learning.pdf. Last accessed Jan. 25, 2008, 9 pages.

Stefano Mizzaro. Measuring the Agreement Among Relevance Judges, MIRA Conference, 1999 http://citeseer.ist.psu.edu/cache/papers/cs/20797/http:zSzzSzwww.dimi.uniud.itzSz~mizzarozSzpaperszSzagreement-mira.pdf/mizzaro99measuring.pdf. Last accessed Jan. 25, 2008, 13 pages.

T. Joachims. Optimizing Search Engines using Clickthrough Data. SIGKDD 02 Edmonton, Alberta, Canada. ACM 158113567X/02/0007. http://www.cs.cornell.edu/people/tj/publications/joachims_02c.pdf. Last accessed Jan. 25, 2008, 10 pages.

Chris Buckley, et al. Retrieval Evaluation with Incomplete Information. SIGIR'04, Jul. 25-29, 2004, Sheffield, South Yorkshire, UK. ACM 1-58113-881-4/04/0007. http://doi.acm.org/10.1145/1008992.1009000. Last accessed Jan. 25, 2008, 8 pages.

\* cited by examiner

|  | BAD | FAIR | GOOD | EXCELLENT | PERFECT | TOTAL |
|---|---|---|---|---|---|---|
| BAD | 0.579 | 0.290 | 0.118 | 0.014 | 0.000 | 221 |
| FAIR | 0.208 | 0.332 | 0.309 | 0.147 | 0.003 | 307 |
| GOOD | 0.095 | 0.348 | 0.286 | 0.260 | 0.011 | 273 |
| EXCELLENT | 0.011 | 0.167 | 0.264 | 0.535 | 0.022 | 269 |
| PERFECT | 0.000 | 0.042 | 0.125 | 0.250 | 0.583 | 24 |

FIG. 6

|         | A < B | A, B BAD | A > B | TOTAL |
|---------|-------|----------|-------|-------|
| A < B   | 0.752 | 0.033    | 0.215 | 2580  |
| A, B BAD| 0.208 | 0.567    | 0.225 | 413   |
| A > B   | 0.201 | 0.034    | 0.765 | 2757  |

FIG. 7

|  | A < B | A, B BAD | A > B | TOTAL |
|---|---|---|---|---|
| A < B | 0.663 | 0.052 | 0.285 | 2566 |
| A, B BAD | 0.297 | 0.380 | 0.323 | 437 |
| A > B | 0.284 | 0.052 | 0.664 | 2617 |

FIG. 8

|        | A << B | A < B | A, B BAD | A > B | A >> B | TOTAL |
|--------|--------|-------|----------|-------|--------|-------|
| A << B | 0.247  | 0.621 | 0.000    | 0.132 | 0.000  | 219   |
| A < B  | 0.059  | 0.661 | 0.043    | 0.221 | 0.015  | 2288  |
| A, B BAD | 0.000 | 0.244 | 0.453  | 0.300 | 0.002  | 406   |
| A > B  | 0.012  | 0.212 | 0.051    | 0.670 | 0.055  | 2389  |
| A >> B | 0.000  | 0.180 | 0.005    | 0.680 | 0.134  | 194   |

| | PREFERENCE | DEFINITE | ABSOLUTE | OVERALL |
|---|---|---|---|---|
| ASSESSOR 1 | 4 | 3 | 8 | 4 |
| ASSESSOR 2 | 3 | 4 | 6 | 4 |
| ASSESSOR 3 | 2 | 3 | 6 | 3 |
| ASSESSOR 4 | 4 | 4 | 9 | 5 |
| ASSESSOR 5 | 3 | 3 | 8 | 3 |
| ASSESSOR 6 | 2 | 2 | 3 | 2 |
| OVERALL | 3 | 3 | 6 | 3 |

|        | NDCG  | BPREF | WPREF |
|--------|-------|-------|-------|
| DCG    | 0.748 | 0.485 | 0.584 |
| NDCG   |       | 0.662 | 0.738 |
| BPREF  |       |       | 0.959 |

FIG. 11

Which page is more relevant when you search for:

Adesso Razer ExactMat Anodized Aluminum Mousing Surface (RZ 3050)

FIG. 13

PREFERENCE JUDGEMENTS FOR RELEVANCE

BACKGROUND

Information retrieval is the science of searching for information in documents, searching for documents themselves, searching for metadata which describes documents, or searching within databases, whether relational standalone databases or hyper textually linked databases, such as the World Wide Web. Automated information retrieval systems are typically used to reduce information overload. Many universities and public libraries use information retrieval systems to provide access to books, journals, and other documents. Web search engines (e.g., Live Search) also use information retrieval techniques and are one of the most visible and commonly utilized manifestations of an information retrieval application.

An information retrieval process typically begins when the user enters a query into an information retrieval system. Queries are typically formal statements of information need, for example, search strings in web search engines. In information retrieval a query does not necessarily uniquely identify a single object in the collection; rather several objects may match the query, perhaps with different degrees of relevancy.

An object can be an entity that keeps or stores information in a database, for instance. User queries can thereafter be matched to the objects stored in the database where, depending on the application, the data objects can be, for example, text documents, images, or videos. In order to facilitate efficient query matching, most information retrieval systems compute a numeric score reflecting how well each object in the database matches the query, and ranks the objects according to this value or in combination with other information. The top ranking objects can then be shown to the user and the process can be iterated should the user wish to further refine the query.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

Information retrieval systems have traditionally been evaluated using absolute judgments of relevance: each document is judged for relevance on its own, independent of other documents that may be on topic. Nevertheless, it has been observed that preference judgments of the form "document A is more relevant than document B" are generally easier for assessors to make than absolute judgments.

The matter as claimed provides system and/or method that can train or evaluate ranking techniques, algorithms, or methodologies utilized by various facilities and utilities, such as search engines, spam filters, information retrieval systems, and the like. In accordance with an illustrative aspect, the systems and/or methods can utilize to acquire relative preference judgments from assessors (e.g., human or machine implemented) wherein a set of documents is obtained from a storage device, the set of documents is combined with a judgment task to form a comparative selection panel. The generated comparative selection panel can be presented for evaluation to the assessors who make selections as to which document in the set of documents in their opinion satisfies or is most relevant in answering or satisfying the judgment task (e.g., an indication of commerciality, quality of design, readability, query etc.). The evaluations provided by assessors can be persisted, tabulated and/or recorded, and then employed to produce a ranked comparative assessment of the provided documents in relation to the judgment task presented.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 6 provides an illustrative table that outlines assessor agreement for absolute judgments in accordance with an aspect of the claimed subject matter.

FIG. 7 provides another illustrative table that outlines assessor agreement for preferences in accordance of yet another aspect of the claimed subject matter.

FIG. 8 provides yet another illustrative table that sets forth preferences inferred from absolute judgments in accordance with an aspect of the subject matter as claimed.

FIG. 9 provides a table that exemplifies assessor agreement for definite preference judgments in accordance with an aspect of the claimed subject matter.

FIG. 11 provides a further table that depicts the correlation between evaluation measures in accordance with an aspect of the claimed subject matter.

FIG. 13 provides depiction of an illustrative interface that can be generated in accordance with an aspect of the claimed subject matter.

DETAILED DESCRIPTION

Figure 1:
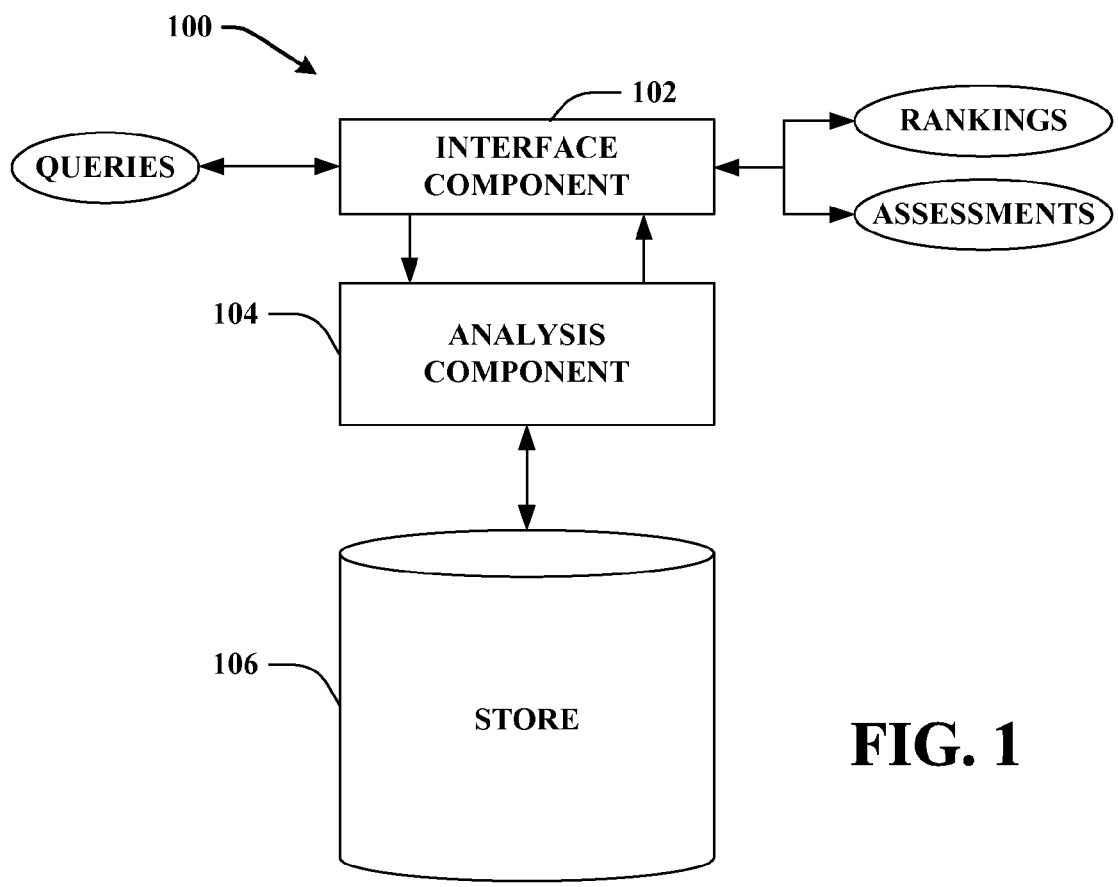
FIG. 1 illustrates a machine-implemented system that trains or evaluates ranking techniques by employing or obtaining relative preference judgments in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

It should be noted at the outset that while the claimed subject matter is explicated for the purposes of clarity, simplicity of exposition, and comprehension, in the context of documents, the subject matter as claimed is not so limited. The claimed subject matter can find applicability in a plethora of other contexts, mechanisms, and applications beyond the document paradigm. For example, the claimed subject matter can be applied to other types of objects persisted in a database or from external sources without departing from the intent and scope the subject matter as claimed. Accordingly, any and all such applicability, and derivations thereof, is deemed to fall within the ambit of the claimed subject matter.

Information retrieval relevance judgments have traditionally been made on an absolute scale: a document is either relevant to a judgment task (e.g., query) or it is not. This definition of relevance is motivated by the importance of topicality in tasks studied in information retrieval research. When the goal is to find all the relevant material, there is no reason to say that one document is "more relevant" than another; if both are on topic, no matter how tenuous or remote the relationship, then both are considered relevant.

In retrieval tasks such as homepage finding, known-item finding, 'shallow' searches, or commercial transactions, however, documents are more naturally judged on a spectrum that allows distinctions between different degrees of relevance. Researchers have formulated evaluation measures most notably discounted cumulative gain (DCG) that allows for such graded judgments.

Although evaluations over graded relevance allow for finer distinctions among documents, adopting graded relevance has two drawbacks. First, researchers must define the specifics of the gradations (e.g., how many levels to use and what those levels mean), and it is not clear how these choices affect relative performance measurements. Second, the burden on assessors increases with the complexity of the relevance gradations; whereas before a judge or assessor needed only to assess whether or not the document was relevant, now the judge or assessor must be able to assign a particular level of relevance to each document.

The claimed subject matter can avoid the aforementioned shortcomings entirely, while still capturing degrees of relevance distinctions among documents, by making preference judgments instead of absolute judgments. Instead of assigning relevance labels to a document, an assessor can look at two or more pages and judge whether they prefer one over the others. This can be a binary decision, so there typically is no need to determine a set of labels (though this can be done if desired) and no need to map judgments to a numeric scale.

A further advantage of direct preference judgments is that techniques and/or algorithms, such as ranking Support Vector Machines (SVMs), are generally trained over preferences. Sometimes preferences can be obtained by inference from absolute judgments. By collecting preferences directly, some of the noise associated with difficulty in distinguishing between different levels of relevance can be reduced.

Selecting a preference is typically easier than making an absolute judgment. Generally, these two types of judgment (e.g., absolute and preference) can be compared in terms of assessor consistency (e.g., agreement between assessors) and the amount of time spent on each judgment. In order to measure consistency or agreement between assessors the claimed matter provides a design where each judgment task is viewed by at least two assessors for each judgment type. The design employs a block design where each of the queries or judgment tasks is judged by the assessors, two assessors using each of three judgment types (e.g., assessors use each judgment type to judge one third of the queries or judgment tasks).

The claimed subject matter provides or generates separate user interfaces for each of the three judgment types. In an illustrative aspect the generated interface displays the judgment task for which response is to be solicited at the top of the generated screen. Further, where an assessor does not understand the judgment task for which a response is required, more context can be provided, for example, by clicking on a magnifying glass to see snippets from the top 20 documents (e.g., web pages) retrieved by a search engine. The order of these documents typically can be randomized so as not to influence assessor judgment. Moreover, each user interface generated for each of the three judgment types can be allocated the same area (e.g., display footprint) regardless of whether one or more generated user interface is to be presented for analysis by assessors. Additionally, query terms found within documents (e.g., identified using a simple parse of documents) presented for analysis can be highlighted to make it easier for assessors to find relevant content.

In the context of the claimed matter, queries or judgment tasks can be obtained from query logs associated with a search engine, for example, and each query or judgment task can be selected based at least in part on a biased sample of queries or judgment tasks that provides diversity in existing judgments, but in all other respects the query or judgment task selected can be random: some queries or judgment tasks can have clear user intent, whereas others can be vague, unspecified, or can have a myriad of possible other intents. More generally, the queries or judgment tasks can be chosen to optimize for the target population of the application or to explore how two or more search engines performance varies over queries of a specific type.

In terms of the documents employed by the claimed matter these can be acquired from one or more conventional search engines or directly through a web crawler. The number of unique documents assessed or judged can be dependent on the diversity of results retrieved by the search engines: if all search engines retrieve the same documents, there will be as many documents as the number search engines utilized, but if the search engines retrieve different documents and a select number of documents are retrieved (e.g., the top five documents) for analysis then the number of documents to be processed or assessed can be commensurately large (e.g., number of search engines utilized * number of documents selected for assessment). For example, if only the top five documents are retrieved by three large search engines, and where all three engines retrieve the same documents, there would only be five pages to judge, but if the three search engines all retrieve different documents, there will be 15 documents to assess or judge.

Additionally, the claimed subject matter generally does not need to remove pages that have duplicate content but different Uniform Resource Locators (URLs) as there can be cases in which the URL provides some valuable additional information that can be used to aid the assessment of relevance. For example, a query or judgment task can specify a product number and two identical pages about the product can be retrieved, while neither page may contain the product number itself, the product number nevertheless can be a constituent component of the URL.

Furthermore, in order to avoid time delays or temporary Internet outages, the claimed subject matter can pre-capture or cache documents by saving images of them to persistent media. Such pre-capturing or caching of documents can also guarantee that the documents are saved at a fixed point in time, thus ensuring consistency in the documents to be assessed.

In accordance with an aspect of the claimed subject matter, generated interfaces for absolute judgments can have buttons displayed along the top of the generated interface (e.g., fair, good, excellent, perfect) as well as a "bad" judgment button associated with the displayed document. In contrast for preference judgments the generated interfaces can include buttons that elicit a preference from the assessor. For example, the generated preference eliciting interface can present two documents for assessment, at the top of each presented document the query or judgment task under assessment can be displayed, further throughout the presented documents query terms can be highlighted, and buttons such as: "I like this one" can be displayed, or where stronger preferences are to be elicited two buttons (e.g., "I like this one", "BUT I LOVE this one" or as exemplified in FIG. 13, "Here", "Definitely Here") can be associated with each document, additionally, a "Bad" judgment button can also be associated with the displayed documents and can be used to indicate documents that clearly are not relevant, had not been properly loaded, or are spam. Documents denoted as spam should typically not be seen again in any other document comparison.

Assessors can be asked to judge documents based on topical relevance as well as factors such as the generality of query versus document, the ease of finding relevant content in the document, and so on. Additionally, assessors can be provided guidelines that describe how different factors should be evaluated or weighted.

Document pairs can be selected for preference judgments based at least in part on a fixed ordering and/or by an assessor's previous judgment. For instance, where an assessor prefers document A to document B, the next document presented for comparison should be between document A and document C: the preferred page should be kept constant. In this manner the cognitive load imposed on assessors can be significantly reduced. Typically, a person has to re-familiarize themselves with a document to make a judgment. Thus, for example, taking away document B and later presenting it again makes the assessor have to reacquaint him or herself with document B one more time. Accordingly, where the goal is to surface the most relevant document to the top with the least amount of assessor effort, the claimed subject matter attempts to reduce the number of times documents near the top of the ranking need to be reread.

Once all the judgments have been made, for example, with respect to document A and other documents (e.g., documents B through Z), judgments can be restarted with documents B and C (documents B and D, documents B and E, . . . ). Nevertheless, the initial ordering of documents as items A through Z, for example, can be perfectly random. More generally, the order can be chosen to tradeoff randomness, assessor effort, and number of pairs that must be judged.

FIG. 1 illustrates a system 100 that trains or evaluates ranking techniques by obtaining or employing preference judgments. System 100 can include interface component 102 (hereinafter referred to as "interface 102") that can receive and/or transmit queries or judgment tasks, rankings (e.g., employed by search engines, spam filters, . . . ), and/or assessments (e.g., utilized to train search engines, spam filters, and the like) to and/or from other components (not shown), such as spam filters, search engines, search ranking techniques (e.g., image or text retrieval systems, query retrieval mechanisms, information retrieval modalities, etc.). Further, interface 102 can receive and/or disseminate, communicate, and/ or partake in data interchange with a plurality of other disparate sources and/or components. Additionally and/or alternatively, interface 102 can obtain and/or receive data associated with usernames and/or passwords, sets of encryption and/or decryption keys, client applications, services, users, clients, devices, and/or entities involved with a particular transaction, portions of transactions, and thereafter can convey the received or otherwise acquired information to analysis component 104 for subsequent utilization, processing, and/or analysis. To facilitate its objectives, interface 102 can provide various adapters, connectors, channels, communication pathways, etc. to integrate the various components included in system 100, and more particularly, analysis component 104, into virtually any operating system and/or database system and/or with one another. Additionally and/or alternatively, interface 102 can provide various adapters, connectors, channels, communication modalities, and the like, that can provide for interaction with the various components that can comprise system 100, and/or any other component (external and/or internal), data, and the like, associated with system 100.

Further, system 100 can also include analysis component 104 that, in accordance with an aspect of the claimed subject matter, can receive queries or judgment tasks from interface 102 and documents from store 106 for analysis and processing and thereafter can provide assessments and/or rankings for use by a myriad of utilities and applications, such as email filters, retrieval facilities, spam filters, and the like. Analysis component 104 can upon receipt of queries or judgment tasks from interface 102 and document from store 106 can identify sets of documents for processing and/or assessment. For instance, where 1000 documents have been drawn from store 106, analysis component 104 can order the documents (e.g., randomly, by size, by the date that the document was persisted to store 106, . . . ). It will be apparent to those reasonably skilled in this field of endeavor that while analysis component 104 is depicted as receiving and/or acquiring documents from store 106, analysis component 104 can also with equal utility and/or applicability dynamically and/or automatically acquire and/or receive documents from a network topology and/or cloud. Such a network topology and/or cloud can include any viable communication and/or broadcast technology, for example, wired and/or for wireless modalities and/or technologies can be utilized to effectuate the claimed subject matter. Moreover, the network topology and/or cloud can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distributed—and/or any combination, permutation, and/ or aggregation thereof. Additionally, the network topology and/or cloud can include or encompass communications or interchange utilizing Near-Field Communications (NFC) and/or communications utilizing electrical conductance through the human skin, for example.

Having identified or selected sufficient documents from store 106, analysis component 104 can generate an appropriate interface wherein a different interface can be created depending on the type of judgment to be elicited (e.g., absolute judgments, binary preference judgments, or a stronger version of binary preference judgments). For instance, for absolute judgments, a single panel can be displayed where the query or judgment task under consideration can be presented at the top of the page, thereafter various judgment gradation buttons (e.g., Fair, Good, Excellent, and/or Perfect) relating to the document under consideration can be displayed. Additionally, a "Bad" judgment button can be shown for documents that in the opinion of the assessor are irrelevant to the query or judgment task presented, were not properly loaded, or are spam, in which case the document can be omitted from the current list of documents (e.g., the document will not be presented again for comparison in relation to the displayed query) in the current round of assessment. In relation to binary preference judgments and/or the stronger version of binary preference judgments, a similar presentation pattern to that outlined above in relation to absolute judgments can be adopted. For example and as depicted in FIG. 13, interfaces generated for the purposes of binary preference judgments and/or the stronger version of binary preference judgments can include buttons that elicit a preference from an assessor. For instance, the generated preference eliciting interface can present two documents for assessment side-by-side, at the top of each displayed document the query or judgment task under consideration can be displayed, further throughout the presented documents query terms can be highlighted (e.g., identified using a simple parse of documents), and buttons such as "Here", "Definitely Here" can be associated with each document. Further, a "Bad" judgment button can also be shown, and utilized by assessors, for documents that in the opinion of the assessor have no relevance to the presented query, had not been properly loaded, or are spam, in which case the document can be omitted from the current list of documents (e.g., the document will not be presented again for comparison in relation to the displayed query) in the current round of assessment.

Analysis component 104 having generated and presented an appropriate preference eliciting interface (e.g., absolute judgment interface, binary preference interface, or the stronger version of a binary preference judgment interface) can wait for a response from an assessor viewing the preference eliciting interface and when the assessor responds analysis component 104 can note or persist the response to store 106 for future utilization, or can employ the response elicited from the assessor to select or desist from identifying other documents for presentation, selection, and/or judgment analysis.

In relation to store 106, this persistence means in addition to storing or persisting documents related to the claimed aspect of the claimed subject matter can also include any other suitable data necessary for analysis component 104 to facilitate it aims. For instance, store 106 can include information regarding user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that store 106 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 106 of the subject systems and methods is intended to comprise, without being limited to, these and any other suitable types of memory. In addition, it is to be appreciated that store 106 can be a server, a database, a hard drive, and the like.

Figure 2:
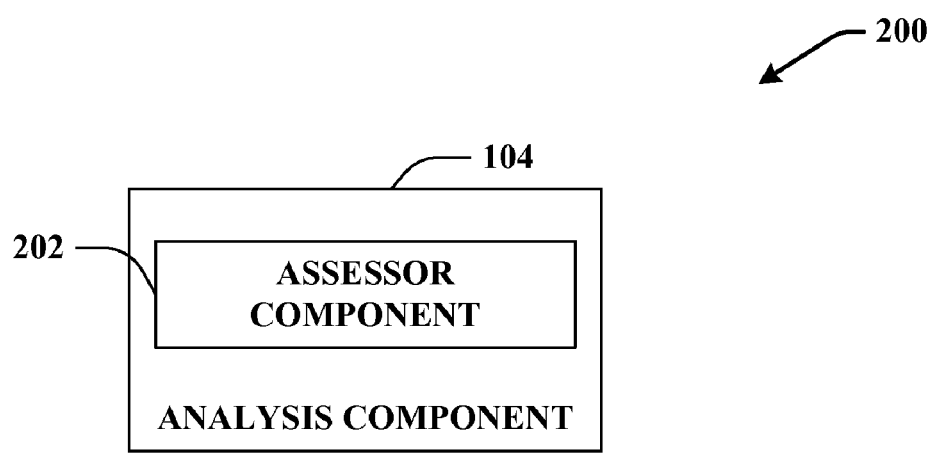
FIG. 2 provides a more detailed depiction of an illustrative analysis component that facilitates or effectuates training or evaluation of ranking techniques by employing or obtaining relative preference judgments in accordance with an aspect of the claimed subject matter.

FIG. 2 provides more detailed illustration 200 of analysis component 104. As illustrated analysis component 104 can include an assessor component 202 that can gather or acquire documents (e.g., either from store 106 or actively and/or passively solicit documents through a network topology and/or cloud). Based on the gathered or acquired documents and further because the way in which judgments are made and the number of judgments that are needed to be made can be costly in terms of time, assessor component 202 can dynamically select or choose how judgment options should be presented. For example, assessor component 202 can order the presentation of documents and/or queries or judgment tasks in a manner that reduces the number of judgments that need to be made. Additionally and/or alternatively, assessor component 202 can reduce variability by ensuring that subsequent presented documents are consistent with previous judgments that an assessor may have made. For example, if there are three documents, A, B, and C, and previously the assessor has stated that he or she prefers A over B and B over C, the assessor component 202 can deduce that an assessor need not be presented documents A and C for comparison since it has already been established that the assessor has elicited a preference for A over B and B over C.

Additionally, since there are instances where assessors are capable of making reliable absolute judgments, assessor component 202 can determine whether or not an assessor is able to make a reliable absolute judgment or whether a preference judgment (e.g., binary preference judgment or enhanced preference judgment) should be elicited from the assessor. Thus, in accordance with the assessor component's 202 determination regarding an assessor's capabilities, an absolute preference eliciting interface can be generated and presented to the assessor, or alternatively a binary preference judgment or enhanced preference judgment interface can be presented to the assessor for response. Such dynamism in selecting between appropriate interfaces to present to an assessor can reduce the number of judgments or preferences that an assessor needs to make.

Figure 3:
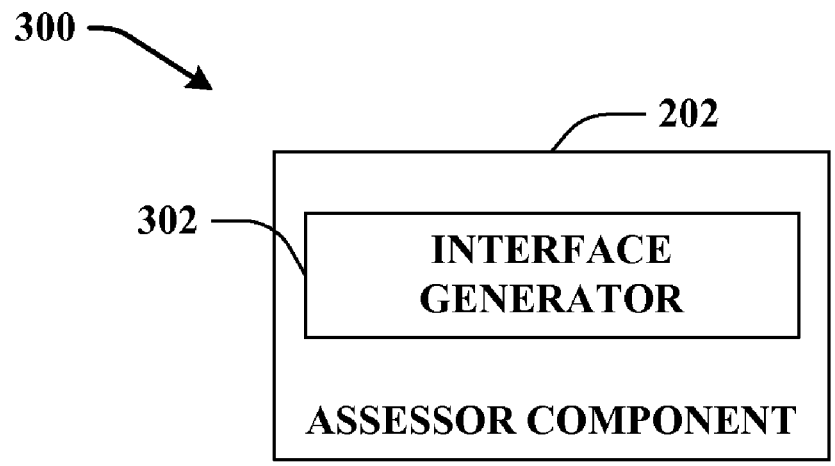
FIG. 3 provides a more detailed depiction of an illustrative assessor component that facilitates or effectuates training or evaluation of ranking techniques by employing or obtaining relative preference judgments in accordance with an aspect of the claimed subject matter.

FIG. 3 provides a more detailed depiction 300 of assessor component 202 in accordance with an aspect of the claimed subject matter. As illustrated assessor component 202 can through included interface generator 302 create or generate absolute and/or preference interfaces, rationalize presentation of documents and/or queries or judgment tasks, reduce variability of documents presented, and/or dynamically determine whether to present to the assessor absolute judgment interfaces or preference judgment interfaces.

In order to generate interfaces for absolute or preference judgments, rationalize the order of presentation of documents and/or judgment tasks or queries, reduce document variability, and/or determine whether or not to generate and/or present to the assessor an absolute judgment interface or a preference judgment interface, interface generator 302 can utilize probabilistic models—models employed to rank items, such as documents or judgment tasks or queries. Moreover, it should be noted that in addition to utilizing probabilities modeling modalities, interface generator 302 can also train the probabilistic model being employed through various feedback features.

Additionally and/or alternatively, interface generator 302 can employ a property of transitivity to learn the probabilistic model or evaluate the document/query. Utilization and employment of transitivity typically can make the system more efficient. Interface generator 302 thus can utilize transitivity, or a property of transitivity, to generate the one or more interfaces (e.g., absolute judgment interface, binary preference interface, or the stronger version of a binary preference judgment interface), rationalize all or the presentation of documents and/or judgment task or queries, reduce the variability of documents, and/or dynamically selecting to present absolute judgment interfaces rather than preference judgment interfaces.

Additionally, in order to make evaluation of documents efficient, especially in the context of webpage evaluation, interface generator 302 can utilize pre-caching. Because documents, and in particular web pages, can be dynamic, changing over time, caching or pre-caching in effect normalizes documents so that all assessors view the same documents rather than disparate documents that can be obtained where the documents are loaded contemporaneously or from scratch every time with varying page/document formats/information that can affect the documents relevance for the purposes of judgment analysis. Thus, by caching or pre-caching documents or web pages, assessors typically will be viewing the same documents/pages during the evaluation so where there is agreement or disagreement among assessors, the agreement will be in context of the same set of documents. Moreover, employment of cached or pre-cached documents can reduce or eliminate latency costs associated with downloading documents off of the Internet, making the evaluation process for assessors more seamless and efficient in terms of time for undertaking the evaluation.

There are typically two types of agreement: agreement between two assessors over all judgments, or agreement about each judgment over all assessors. It nevertheless has been observed that the latter tends to average out differences in expertise, prior knowledge, or interpretation of the query.

Agreement for absolute judgments is shown in FIG. 6, wherein each cell ($J_1$, $J_2$) is a probability that one assessor would say $J_2$ (column) given that another said $J_1$ (row). They can be normalized by row, which is why columns do not add up to 1. The percentage of documents with each label is 20%, 28%, 25%, 25%, and 2%, from Bad, Fair, Good, Excellent, and Perfect, respectively.

Agreement for preference judgments is illustrated in FIG. 7. For comparison, preferences from absolute judgments can be inferred: if the judgment on document A was greater than the judgment on document B, it can be inferred that document A was preferred to document B. Since this could result in documents being the same, ties can be randomly assigned (except for both documents being labeled "Bad") to one of two preferences, simulating an assessor that makes a random judgment about which two similar pages are preferred. Agreement for these inferred preferences is shown in FIG. 8. Comparing values in each cell suggests that assessors agree more about true preferences than about inferred preferences: the difference in agreement is significant by a $\chi^2$ test ($\chi^2$=203, df=4, p≈0).

Agreement for the two-level "definite" preferences is illustrated in FIG. 9. Assessors do not appear to have been very consistent in their view of the "definitely" judgment. When the definite judgments are pooled together with the preference judgments (e.g., A<B and A<<B treated as identical), the disagreement is slightly less than in FIG. 7, but more than FIG. 8.

The median number of seconds spent on each judgment by each assessor for each interface (e.g., preference, definite, absolute) is depicted in FIG. 8, along with overall medians for each user and for each interface. Absolute judgments consistently took twice as long to make as preference judgments. As FIG. 8 shows, there can be little variation among assessors.

Two main variables can affect the time it takes to judge a document or a set of documents: time spent reading the document(s) and time spent deciding on the correct judgment. It is posited that one reason that preferences could be faster is that the assessor "memorizes" the document, or at least forms an impression of it, so that the assessor does not have to re-read the document each time that the document appears. If this were the case, judgments would get faster as each document had been seen.

To investigate this, one can look at the time each assessor spends making a judgment the first time the document is shown. For the preference, definite, and absolute judgments, it was found that the median time spent on a judgment when seeing a document for the first time can be 4, 5, and 6 seconds, respectively. Thus, it seems that making a preference judgment is typically faster than making an absolute judgment even after taking reading time into account.

With preference judgments, standard evaluation techniques like average precision and DCG can be inadequate. Accordingly, new evaluation techniques must be developed. One evaluation measure that can be employed is based on absolute binary judgments (bpref), loosely defined as the number of relevant documents ranked above non-relevant documents divided by a normalizing constant, can be adapted to preference as follows: count all pairs of documents i, j such that i is preferred to j by an assessor and i is ranked above j by a judgment engine. If i and j are both unranked, ignore the pair. If i is ranked but not j, consider i as being ranked above j.

Additionally, a rank-weighted version (wpref) of the foregoing can be defined wherein each pair of documents can be weighted by the reciprocal of the log of the higher of the ranks at which the two documents were retrieved (plus one to avoid dividing by zero). If, for example, document i was retrieved at rank 2 and document j was retrieved at rank 5, the weight for that pair is $$\frac{1}{\log(2+1)}.$$

The rank-weighed version (wpref) is then the sum of the weights of pairs that are correctly ordered by the judgment engine.

Evaluations were compared between four different measurement techniques (e.g., DCG, NDCG, bpref, and wpref). DCG at rank k can be defined as:

$$DCG@k = \sum_{i=1}^{k} \frac{rel_i}{\log(i+1)}$$

where $rel_i$ is the relevance of the document at rank i. NDCG@k is DCG@k divided by the DCG of the top k most relevant documents ranked in descending order of relevance.

DCG and NDCG can be calculated over both sets of absolute judgments obtained for each query. Since assessor disagreement can be a source of variance in a comparison between absolute measures and preference measures, bpref and wpref can be calculated over the preferences inferred from the absolute judgments.

Correlations among the four illustrative measures (e.g., DCG, NDCG, bpref and wpref) are presented in FIG. 11. The absolute based measures correlate well, and the preference based measures correlate well. The correlation between wpref and NDCG is nearly as high as a correlation between DCG and NDCG.

Figure 12:
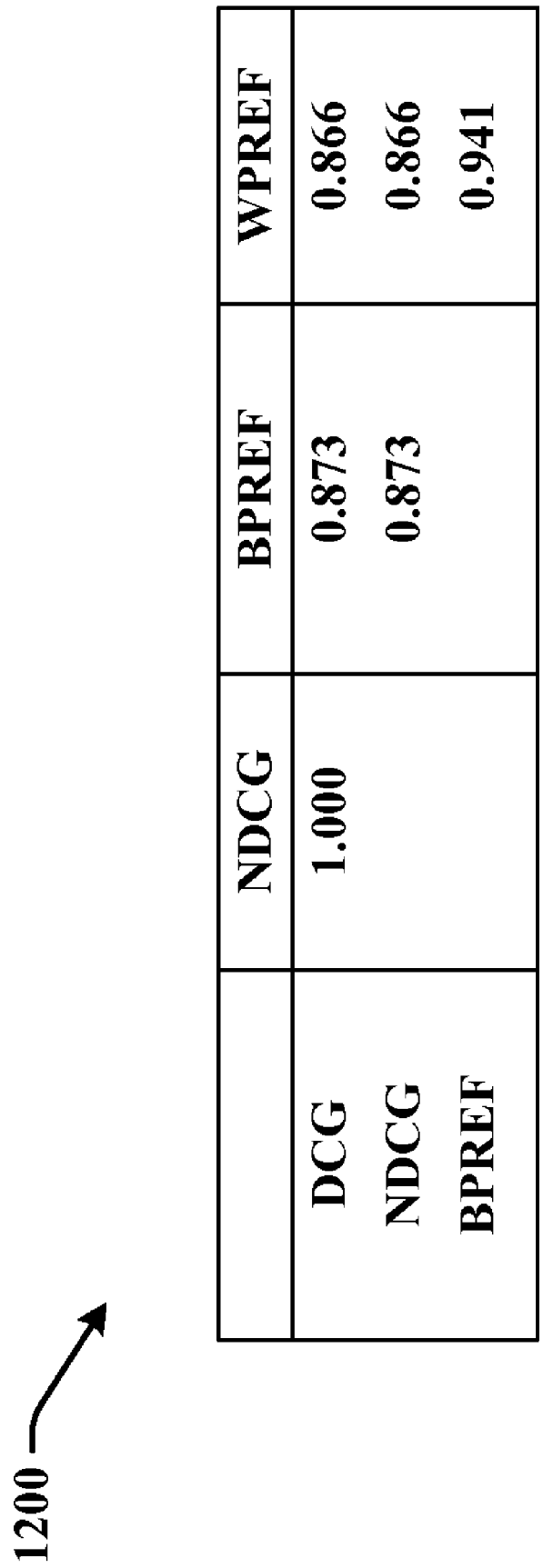
FIG. 12 provides yet a further table that depicts agreement on system differences in accordance with an aspect of the claimed subject matter.

As illustrated by table 1200 presented in FIG. 12 "agreement" among the measures can also be gauged providing indication of which system is better than another. Two measures can be calculated and the sign of the differences identified. If both measures indicate that the difference is positive or negative, they agree; otherwise they disagree. As illustrated in table 1200, the measures agree at a fairly high rate, though preference measures appear to agree more with each other than they do with absolute measures.

Figure 4:
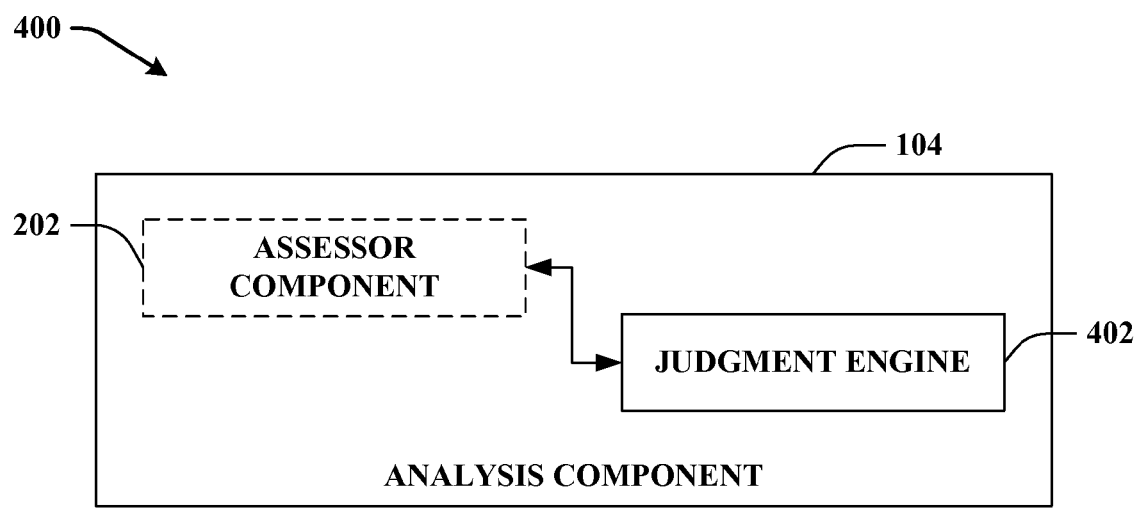
FIG. 4 provides further depiction of an analysis component that effectuates or facilitates training or evaluation of ranking techniques by obtaining or utilizing relative preference judgments in accordance with an aspect of the claimed subject mater.

FIG. 4 provides further illustration of analysis component 104 wherein a judgment engine 402 aspect is provided. One obstacle to the adaptation of preference judgments is that the number of document pairs can typically increase polynomially with the number of documents. Accordingly, in a large-scale evaluation there can be scores, hundreds, or thousands of documents, as documents can be drawn from different engines (e.g., different search engines, spam filters, . . . ) and employ different algorithms. A polynomial increase in the number of judgments can mean much greater cost in assessor time, no matter how proficient assessors become at judging. Accordingly, judgment engine 402 can effectively reduce the number of judgments required of assessors.

In accordance with an aspect judgment engine 402 can utilize transitivity, or a product of transitivity. If it is assumed that assessors are consistently transitive then judgment engine 402 can employ sorting techniques to acquire appropriate judgments. Since sorting is typically $\mathcal{O}(n \lg n)$, the result of such sorting can result in fewer judgments necessitated from assessors and further can improve assessor consistency.

In addition, judgment component 402 can also utilize the fact that in about 20% of absolute judgments by assessors are marked as being "Bad". Since it can reasonably be assumed that nothing will be preferred to these "Bad" documents, it can also be assumed that every non-"Bad" document will be preferred to any "Bad" document. Thus, each "Bad" judgment can provide $\mathcal{O}(n)$ preferences.

Applying transitivity and "Bad" judgments can still provide a full set of preference judgments, though some are inferred rather than asked of the assessor directly. Nevertheless, there can be additional actions that can be undertaken to increase the utility of an assessor's time, and even with some judgments unmade, still prove that differences between systems exist on a particular set of queries.

One action that can be undertaken is that by estimating the utility of a possible judgment and bounding performance differences, the relative performance of systems can be determined with minimal effort. Each judgment can have a particular utility in determining the sign of the difference in a measure over each engine. For example, if bpref is the measure of interest, and engines $E_1$ and $E_2$ both rank document A above document B, then whether document A is preferred to document B or not is of no consequence: the difference in bpref between the two engines will be the same regardless.

Furthermore, since transitivity holds, each judgment made can bring additional transitive judgments along with it. For example, if it has already been adjudicated that document A is preferred over document B and judgment engine 402 is debating whether the next judge (B, C) or (A, C), judgment engine 402 should keep in mind that if it judges document B in preference to document C, then by inference documents A will be preferable to document C by the property of transitivity. Nevertheless, as stated above, whether these transitive judgments are useful can depend on how the documents are ranked by the systems.

The utility function for a preference measure is:

$$U(A, B) = p(A > B) \cdot \text{gain}(A > B) + p(B > A) \cdot \text{gain}(B > A)$$

With $$\text{gain}(A > B) = |w_1(A, B)\text{sgn}(r_1(A) - r_1(B)) - w_2(A, B)\text{sgn}(r_2(A) - r_2(B))| +$$

$$\sum_{i|B>i} |w_1(A, i)\text{sgn}(r_1(A) - r_1(i)) - w_2(A, i)\text{sgn}(r_2(A) - r_2(i))| +$$

$$\sum_{i|i>A} |w_1(i, B)\text{sgn}(r_1(i) - r_1(B)) - w_2(i, B)\text{sgn}(r_2(i) - r_2(B))|$$

The sums are over pairs (i, B) such that it had previously been judged that B>i and (i, A) had been judged i>A. These capture the transitive judgments discussed above. The weights $w_n(i,j)$ can be set for an evaluation measure: $w_n(i,j)=1$ gives the utility function for bpref while $w(i, j)=1/\min\{\log r_n(i)+1, \log r_n(j)+1\}$ (where $r_n(i)$ is the rank of document i by system n) produces the utility function for wpref.

Note that the expected utility can rely on an estimate of the probability that document A is preferred to document B. It can be assumed a priori that this probability is ½. Generally, after some judgments involving document A and B have been made, a probabilistic model can be utilized to estimate the probabilities with or without features. These models can include logistic regression models, calibrated classifiers, or a variety of graphical models including Bayesian networks.

By judging pairs in decreasing order of utility, judgment engine 402 can ensure that after k judgments it has the most possible confidence in the difference between two systems. The next question is how big k has to be before judgment engine 402 can stop judging.

If it is assumed that after k judgments judgment engine 402 has determined that $E_1>E_2$ and that there is no possible way that $E_2$ could "catch up" (e.g., no possible set of judgments to the remaining pairs that would result in $E_2 > E_1$) the judgment engine 402 can have reached a stopping point and can safely stop judging.

Although it can be difficult to determine the exact point at which it can be guaranteed that $E_1$ must be superior to $E_2$, the bounds on $E_1 - E_2$ can be easily determined in order to stop judging before evaluating all pairs. A simple bound iterates over all unjudged pairs and assigns them a judgment depending on how much they would "help" either engine. If there exist a pair i,j such that $E_1$ ranks i above j but $E_2$ ranks j above i, then judgment engine 402 needs to ascertain what happens if j is preferred to i (e.g., that pair helps $E_2$ and hurts $E_1$). Judgment engine 402 can assign judgments in this way for all pairs, ignoring consistency of judgments which can provide a loose bound.

Reordering and early stopping can be applied to absolute judgments as well, but the gain generally is not as dramatic.

Figure 5:
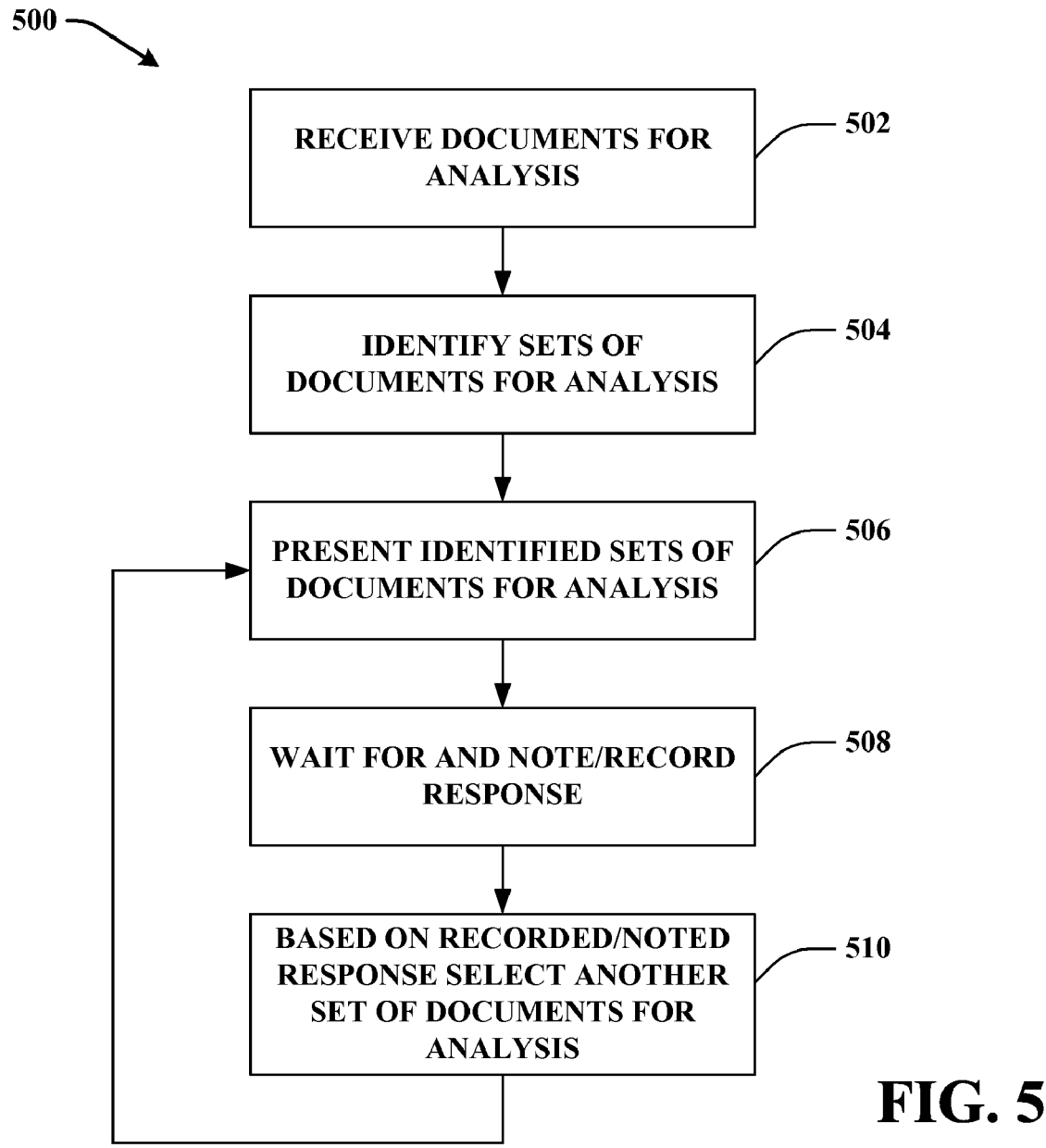
FIG. 5 illustrates a flow diagram of a machine implemented methodology that effectuates or facilitates training or evaluation of ranking techniques by obtaining or utilizing relative preference judgments in accordance with an aspect of the claimed subject matter.
Figure 10:
FIG. 10 provides another table that illustrates the median number of seconds to make a judgment by each assessor in each interface, along with overall median for each interface, each assessor, and overall in accordance with an aspect of the claimed subject matter.

In view of the illustrative systems shown and described supra, methodologies that may be implemented in accordance with the disclosed subject matter will be better appreciated with reference to the flow chart of FIG. 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 5 illustrates a machine implemented methodology 500 that trains or evaluates or evaluates ranking techniques by employing or obtaining relative preference judgments from assessors. At 502 the method can receive or obtain documents from various sources for analysis. For example, documents can be retrieved from persisting devices (both local and remote) or can be contemporaneously drawn from a network topology or cloud (e.g., the Internet). Additionally, a query can be utilized to select which documents to analyze. At 504 set of documents are identified for analysis and to elicit preference judgments from assessors. The set of identified documents can be randomly selected or they can be drawn from the persisting devices based on a neutral selection criteria (e.g., ordered by date, ordered alphabetically, . . . ). At 506 the set of identified documents can be paired with a query or judgment task utilized to gauge relevancy of the documents to the query or judgment task to create a presentation page that can be displayed for an assessor to make a judgment regarding relevancy and preference. At 508 the method can enter a wait state wherein it waits from the assessor to respond with his or her determination of the relevancy of the set of presented documents to the query or judgment task and/or which document in the set of presented documents the assessor believes better satisfies the query or judgment task. At 510 based at least in part on the response elicited from the assessor at 508, the method selects or identifies another set of documents for analysis at which point the methodology cycles back to 506.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 14:
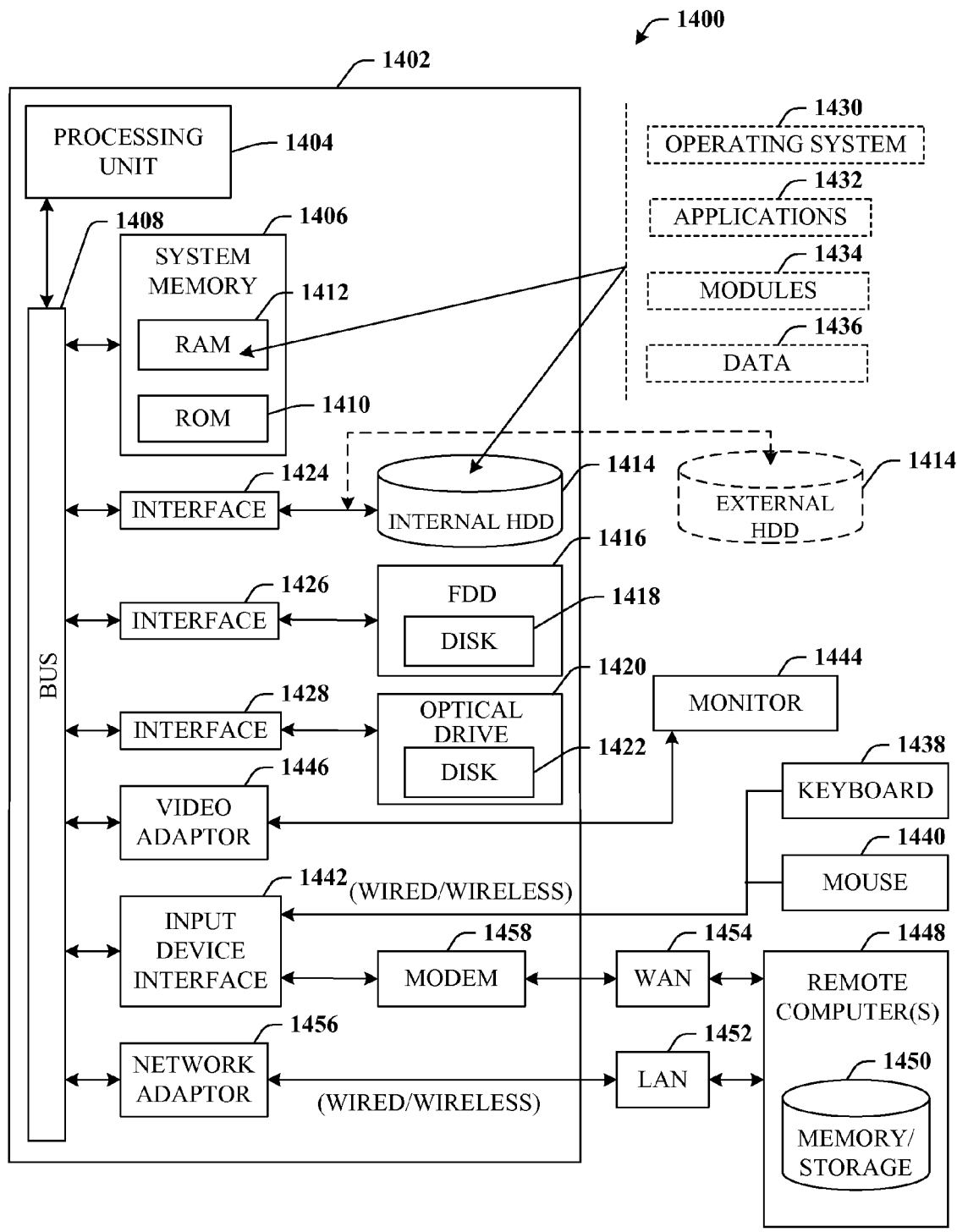
FIG. 14 illustrates a block diagram of a computer operable to execute the disclosed system in accordance with an aspect of the claimed subject matter.

Referring now to FIG. 14, there is illustrated a block diagram of a computer operable to execute the disclosed system. In order to provide additional context for various aspects thereof, FIG. 14 and the following discussion are intended to provide a brief, general description of a suitable computing environment 1400 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the illustrative environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the claimed subject matter can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1094 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are illustrative and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 15:
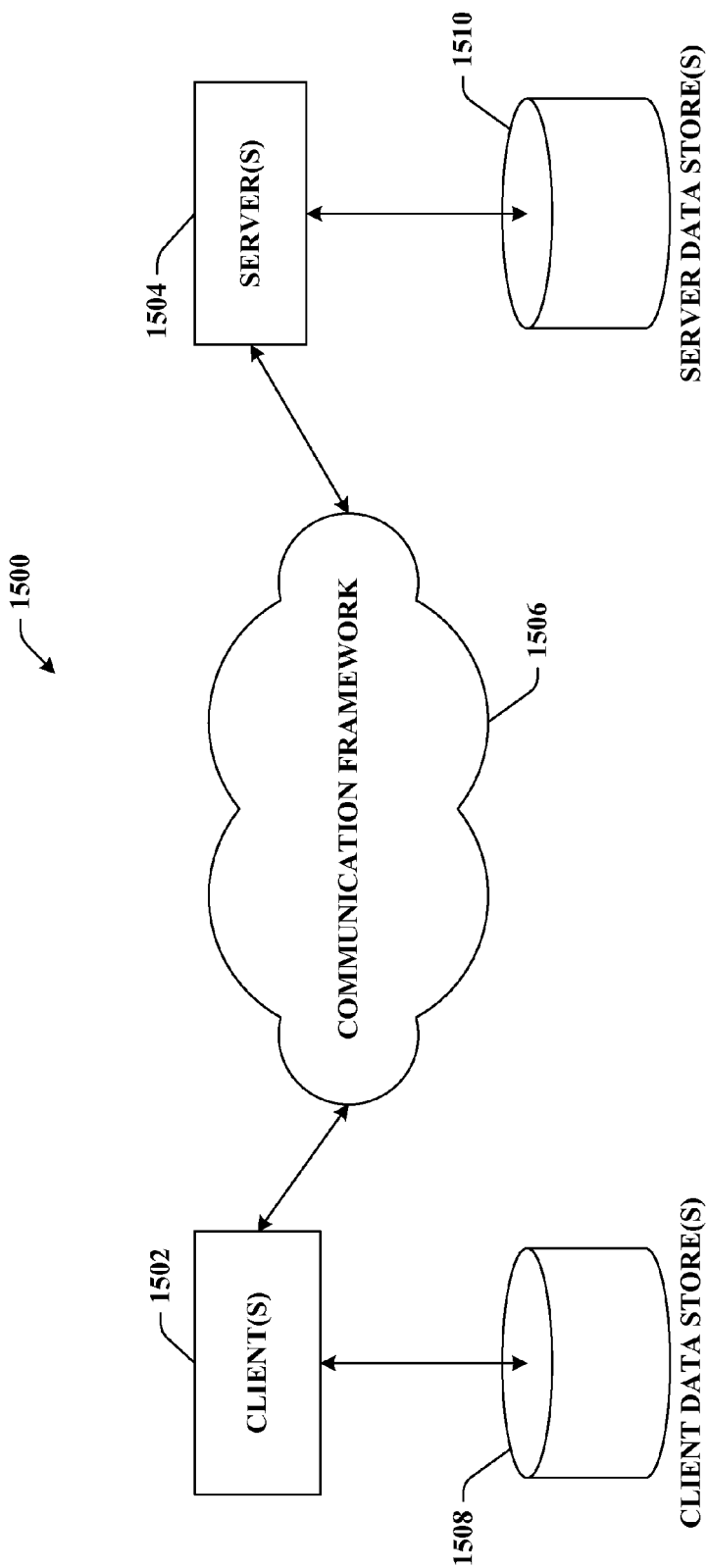
FIG. 15 illustrates a schematic block diagram of an illustrative computing environment for processing the disclosed architecture in accordance with another aspect.

Referring now to FIG. 15, there is illustrated a schematic block diagram of an illustrative computing environment 1500 for processing the disclosed architecture in accordance with another aspect. The system 1500 includes one or more client(s) 1502. The client(s) 1502 can be hardware and/or software (e.g., threads, processes, computing devices). The client(s) 1502 can house cookie(s) and/or associated contextual information by employing the claimed subject matter, for example.

The system 1500 also includes one or more server(s) 1504. The server(s) 1504 can also be hardware and/or software (e.g., threads, processes, computing devices). The servers 1504 can house threads to perform transformations by employing the claimed subject matter, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
    a processor;
    one or more memories communicatively coupled to the processor, the one or more memories having stored instructions that, when executed at the processor, causes the processor to implement a component that at least one of trains or evaluates ranking techniques by at least one of employing or obtaining relative preference judgments, the component configured to retrieve a set of documents from a storage device, combine the set of documents with a judgment task received via an interface to form a comparative selection panel and present the comparative selection panel for evaluation by an assessor, the component requests the assessor to compare documents in the set of documents with each other and make a selection as to which document included in the set of documents most satisfies the judgment task, the component produces a ranked comparative assessment of the set of documents based at least in part on the selection elicited from the assessor,
    the component automatically determining whether to present one or more of a plurality of interfaces to the assessor based on the judgment task, the plurality of interfaces including an absolute judgment panel, a binary selection panel, and a graded preference panel, and
    wherein the absolute judgment panel presents a single document for the assessor to evaluate, the absolute judgment panel requests the assessor to select at least one ranking criteria, the ranking criteria selected by the assessor being associated with the single document,
    the binary selection panel presents at least two documents from the set of documents for review by the assessor, the assessor selects one of the at least two documents as being binarily preferable over another of the at least two documents, and
    the graded preference panel presents at least two documents from the set of documents for review by the assessor, the assessor identifies one of the at least two documents as being preferable, the one of the at least two documents identified as preferable being retained as one of the at least two documents for a next judgment.

2. The system of claim 1, wherein the component dynamically chooses another set of documents based at least in part on a previous selection made by the assessor as to which document included in the set of documents most satisfied the judgment task.

3. The system of claim 1, wherein the component employs a property of transitivity in order to form the comparative selection panel for evaluation.

4. The system of claim 1, wherein selection by the assessor of a bad assessment causes elimination of the single document associated with the bad assessment.

5. The system of claim 1, wherein the component utilizes a probabilistic model to determine whether the comparative selection panel should comprise at least one of the absolute judgment panel, the binary selection panel, or the enhanced binary selection panel.

6. The system of claim 5, wherein the component employs a property of transitivity to learn the probabilistic model utilized to determine whether the comparative selection panel should comprise at least one of the absolute judgment panel, the binary selection panel, or the enhanced binary selection panel.

7. A machine implemented method, comprising:
    obtaining a plurality of documents from at least one of a storage device or a network;
    receiving a judgment task utilized by an assessor for a comparative evaluation of the plurality of documents;
    generating a selection panel that includes at least one document from the plurality of documents for evaluation by the assessor, the generating including determining whether to present one or more of a plurality of interfaces to the assessor based on the judgment task, the plurality of interfaces including an absolute judgment panel, a binary selection panel, and a graded preference panel,
    wherein the absolute judgment panel presents a single document for the assessor to evaluate, the absolute judgment panel requests the assessor to select at least one ranking criteria associated with the single document,
    the binary selection panel presents at least two documents from the plurality of documents for review by the assessor, the assessor selects one of the at least two documents as being binarily preferable over another of the at least two documents, and
    the graded preference panel presents at least two documents from the plurality of documents for review by the assessor, the assessor identifies one of the at least two documents as being preferable, the one of the at least two documents identified as preferable being retained as one of the at least two documents for a next judgment;
    presenting the selection panel to the assessor and receiving a response from the assessor, the response based on a comparison of documents comprising the plurality of documents with each other;
    comparatively ranking the response from the assessor with a previously elicited response from the assessor; and
    producing a ranked list of documents based at least in part on the ranking of the response from the assessor.

8. The method of claim 7, the presenting further comprising reducing a cognitive load imposed on the assessor by ensuring that at least one of the plurality of documents remains static, until all judgments with respect to the at least one of the plurality of documents have been obtained, in relation to other documents included in the plurality of documents during evaluation by the assessor of the plurality of documents.

9. The method of claim 7, the generating further comprising identifying the selection panel for evaluation by the assessor based at least in part on the judgment task and the at least one document from the plurality of documents.

10. The method of claim 9, wherein the absolute judgment panel includes the judgment task and the at least one document and further includes a preference ranking, the preference ranking associated with the at least one document when the assessor selects the preference ranking as the response.

11. The method of claim 10, wherein the preference ranking is affiliated with a lowest preference and associated with the at least one document.

12. The method of claim 7, one or more of the generating, the presenting, the receiving, the ranking, or the producing further utilizing a property of transitivity.

13. The method of claim 7, one or more of the generating, the presenting, the receiving, the ranking, or the producing further employing a dynamically trainable probabilistic model.

14. A system comprising:
one or more processors;
memory communicatively coupled to the one or more processors, the memory having stored instructions that, when executed at the processor, causes the processor to implement a component, the component comprising:
means for utilizing a trainable probabilistic model;
means for producing a comparative selection panel that includes a query and a set of documents, the query and the set of documents included in the comparative selection panel based on a result from the trainable probabilistic model;
means for ranking a response from assessors based on a previously elicited response from the assessors, the response based on a comparison of documents comprising the set of documents with each other; and
means for generating a ranked list of assessments associated with the set of documents based at least in part on a result obtained from the means for ranking,
wherein the component automatically determines whether to present one or more of a plurality of interfaces to an assessor based on the query, the plurality of interfaces including an absolute judgment panel, a binary selection panel, and a graded preference panel, and
wherein the absolute judgment panel presents a single document for the assessor to evaluate, the absolute judgment panel requests the assessor to select at least one ranking criteria associated with the single document,
the binary selection panel presents at least two documents from the set of documents for review by the assessor, the assessor selects one of the at least two documents as being binarily preferable over another of the at least two documents, and
the graded preference panel presents at least two documents from the set of documents for review by the assessor, the assessor identifies one of the at least two documents as being preferable, the one of the at least two documents identified as preferable being retained as one of the at least two documents for a next judgment.

15. The system of claim 14, wherein at least one of the means for producing, the means for ranking, or the means for generating further employs a property of transitivity to at least one of producing the comparative selection panel, ranking the response from the assessors, or generating the ranked list of assessments associated with the set of documents.

* * * * *